Nov. 8, 1955
M. P. GRAHAM
2,723,140
CLAMP POSITIONER
Filed Feb. 25, 1950
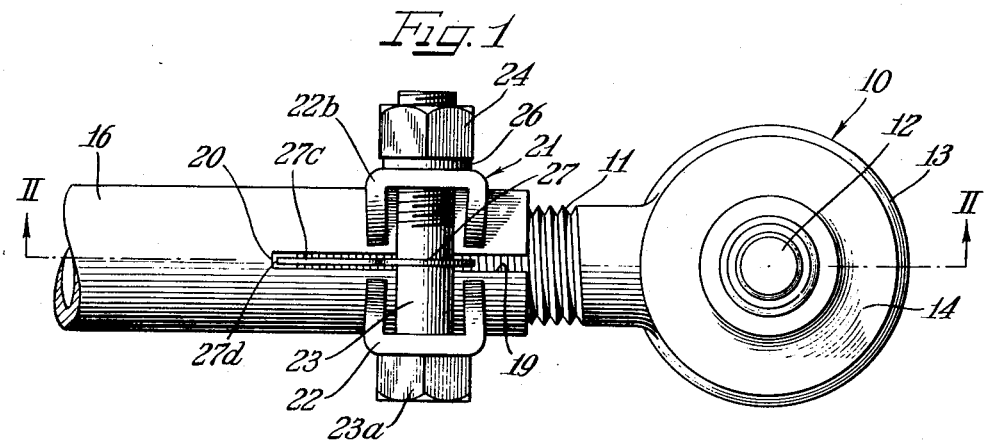
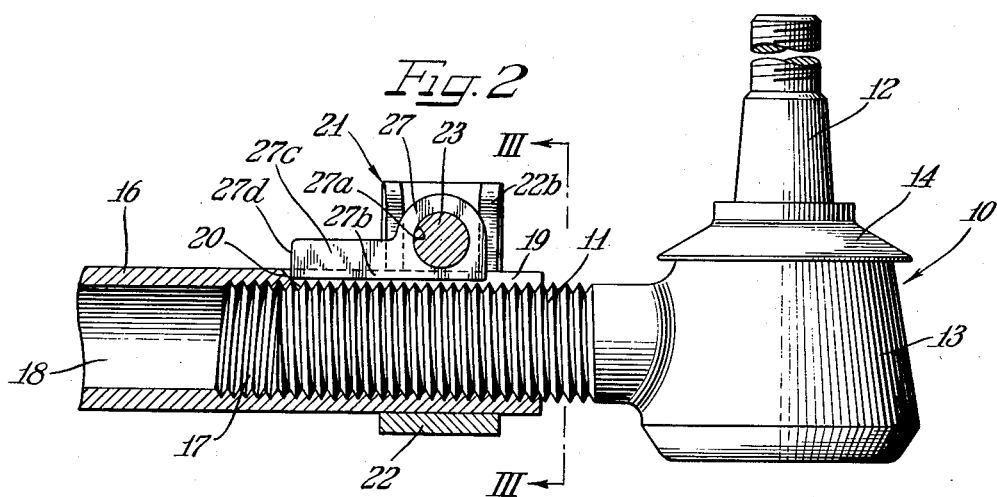
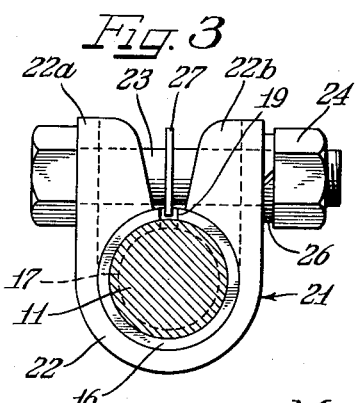
Inventor
Matthew P. Graham
by Attys

United States Patent Office 2,723,140
Patented Nov. 8, 1955

2,723,140

CLAMP POSITIONER

Matthew P. Graham, Detroit, Mich., assignor to Thompson Products, Inc., Cleveland, Ohio, a corporation of Ohio Application February 25, 1950, Serial No. 146,197

3 Claims. (Cl. 287—62)

This invention relates generally to sleeve joints of the type including a shank element receivable in a split sleeve and more particularly relates to a novel and improved clamp positioner as may be embodied in clamps of the type used to radially collapse a split sleeve into locked together relationship with a shank element.

In many mechanical environments, various members of a linkage or the like are locked together in predetermined position by means of a split sleeve which receives a shank and may be radially collapsed by an appropriate clamp surrounding the split end of the sleeve.

In practice, however, it has been found that the most effective clamping is secured when the radially inwardly directed force exerted by the clamp upon the split extensions of the sleeve are in a direction which is generally normal to the plane which includes the longitudinal axis defined by the slot in the sleeve. Moreover, it is also well known that the clamp must be mounted a sufficient distance away from the terminal portions of the slot defined in the sleeve to avoid resistance to a clamping action. In other words, the clamp must be located at an optimum position to avail the user of the most efficient cantilever action.

According to the general features of the present invention, a sleeve having an axial slot formed therein may be radially collapsed into clamping engagement with an appropriate shank element received thereby by means of a clamp incorporating positioning means constructed to relate the clamp and the sleeve in a predetermined relatively fixed relationship. The positioning means includes a key member having a radially inwardly extending portion receivable by the slot to position the clamp peripherally and also has an axially extending portion to abut against the end of the slot in the sleeve so as to position the clamp axially.

By employing a clamp according to the present invention, a clamping action is effected which is not dependent upon visual positioning, as has heretofore been necessary, thereby affording a clamping action which is foolproof and far more efficient in operation than has heretofore been possible.

It is, therefore, an object of the present invention to provide a clamp positioner which will position a clamp in a relatively fixed peripheral and axial position with respect to a radially collapsible axially split sleeve.

Another object of the present invention is to provide a clamping device for a linkage structure employing a radially collapsible split sleeve which is completely independent of visual positioning requisite.

A further object of the present invention is to provide a clamping device for a coupling joint of the type employing a radially collapsible member which may be positioned in a predetermined relatively fixed relationship to deliver an optimum clamping to the coupling element.

Many other features, advantages and additional objects of the present invention will become manifest to those versed in the art upon making reference to the detailed description which follows and the accompanying sheets of drawings on which—

Figure 1 is a plan view of a linkage coupling employing a clamp positioner according to the present invention;

Figure 2 is a cross-sectional view with parts shown in elevation of the coupling shown in Figure 1 taken on line II—II of Figure 1, and Figure 3 is a cross-sectional view with parts shown in elevation taken on line III—III of Figure 2.

As shown on the drawings:

Although the principles of the present invention are generally applicable to any coupling connection employing a radially collapsible element, the embodiments herein illustrated and explained contemplate the application of the principles of the present invention to elements of a steering linkage in a vehicular steering assembly, such assembly customarily including a tie rod end socket indicated generally by the reference numeral 10 have a threaded stem or shank 11 integral therewith, or attached thereto. The socket 10 provides a ball and socket type joint and further includes a threaded stud 12 mounted for universal movement in the housing 13 of the socket 10. A cover 14 may also be provided for the socket 10 to preclude the entry of foreign particles into the socket.

As shown in the drawings, the radially collapsible member of the preferred embodiment herein shown takes the form of a sleeve-like tie rod 16 which is internally threaded as at 17 along a portion of its bore 18. The sleeve 16 is provided with an axial slot 19 which extends longitudinally of the sleeve 16 from the end thereof to a terminal portion defined by a shoulder 20.

It will be apparent that if the sleeve 16 is employed as a linkage element, the length of the linkage may be selectively adjusted by threadedly adjusting the relative axial position of the threaded shank and the threaded sleeve. After a proper adjustment has been made, the sleeve 16 and the shank 11 may be locked in fixed adjusted position by means of a clamp indicated generally by the reference numeral 21 which includes a generally U-shaped body 22 having parallel legs 22a and 22b which may be biased inwardly to produce a clamping action by means of a bolt 23 which extends through both of the legs 22a and 22b of the body 22 and upon which a nut 24 may be selectively tightened.

As shown on the drawings, the bolt 23 includes a bolt head 23a to abut the leg 22a and also receives a conventional lock washer 26 to be interposed between the leg 22b and the nut 24 to retain the nut 24 against loosening.

According to the present invention, positioning means are provided for the clamp 21 which are adapted to locate the clamp relative to the sleeve in a fixed predetermined position.

The positioning means takes the form of a key 27 having a wide end defining an aperture 27a to receive the bolt 23 of the clamp 21 and an elongated narrower leg 27c extending from the wide end 27a. The wide end and leg have a radially inwardly extending portion 27b receivable by the slot 19 to position the clamp 21 peripherally relative to the sleeve 16. The leg 27c terminates in a shoulder 27d to abut against the shoulder 20 at the end of the axial slot 19 to position the clamp 21 in a predetermined longitudinal location relative to the sleeve 16.

It has been found that the employment of a clamping device according to the teachings of the present invention affords a particularly efficient and effective clamping action.

By virtue of the radially inwardly extending portion 27b of the key 27, the clamp 21 is always positioned peripherally in correct relationship relative to the sleeve 16 so that the legs 22a and 22b of the generally U-shaped body 22 of the clamp 21 lie in parallel relationship to a radial plane which would include the axis defined by the axial slot 19, thereby permitting the clamp 21 to deliver a clamping thrust to the sleeve 16 in a direction which will promote efficient radial collapsibility of the sleeve 16.

Moreover, the leg 27c of the key 27 permits the shoulder 27d to abut against the shoulder 20 of the axial slot 19, thereby positioning the clamp 21 axially relative to the sleeve 16 at a location removed from the shoulder 20 by a predetermined distance. Thus, the clamp 21 will be positioned for exerting a favorable cantilever action on the slotted end portion of the sleeve 16 which will not be greatly affected by resistance to clamping offered by the unslotted portion of the sleeve 16.

It will be apparent that I have described a clamp positioner which insures uniformly correct positioning of a clamp relative to a split sleeve of a coupling structure, which is completely independent of visual positioning, and which affords a clamping effect of particularly great efficiency.

Although various modifications might suggest themselves to persons versed in the art, it should be clearly understood that I do not wish to be limited to the precise details herein described and shown by way of illustrative example for purposes of explanation, but wish to embody within the scope of this patent all such modifications as reasonably and properly come within the scope of my contribution to the art.

I claim as my invention:

1. A coupling structure comprising a sleeve having an axial slot, a stem received in said sleeve, and a clamp mounted on said sleeve having a generally U-shaped body having spaced parallel legs on opposite sides of said sleeve, each of said legs having inwardly extending flanges abutting and embracing said sleeve and spaced apart from one another to provide a restricted opening intermediate said flanges, said clamp having a positioning member providing a radially inwardly extending portion received in said axial slot of said sleeve positioning said clamp with said restricted opening of said clamp in register with said axial slot of said sleeve and with said legs of said clamp in generally parallel relation to a radial plane through said slot, thereby angularly aligning the slotted sleeve and the clamp for efficient clamping action on the stem.

2. A coupling structure as defined in claim 1, a bolt extending through said legs, and a nut received on said bolt to draw said legs together thereby to radially collapse said clamp against the slotted sleeve, said positioning member comprising a key member having an aperture formed therein receiving said bolt and being positioned between said flanges in said restricted opening.

3. A coupling structure as defined in claim 2, said key member having an elongated leg formed thereon engaging said sleeve at the end of said axial slot to longitudinally align said clamp and said sleeve.

References Cited in the file of this patent

UNITED STATES PATENTS

| | | |
|---|---|---|
| 476,911 | Westwood | June 14, 1892 |
| 1,205,131 | Beck | Nov. 14, 1916 |
| 1,883,748 | Baker | Oct. 18, 1932 |
| 2,026,338 | Zerk | Dec. 31, 1935 |
| 2,526,470 | Gauthier | Oct. 17, 1950 |

FOREIGN PATENTS

| | | |
|---|---|---|
| 166,328 | Germany | Dec. 30, 1905 |